US012630485B2

(12) United States Patent
Khaleel et al.

(10) Patent No.: US 12,630,485 B2
(45) Date of Patent: May 19, 2026

(54) ACIDIFIED FERTILIZER GRANULES

(71) Applicant: SABIC AGRI-NUTRIENTS COMPANY, Riyadh (SA)

(72) Inventors: Mohamed Akasha Khaleel, Riyadh (SA); Andrew George Kells, Wilton (GB); Hatim Al Dekhiel, Riyadh (SA); Nilkamal Bag, Bangalore (IN); Saleh Nafe AlShammari, Riyadh (SA)

(73) Assignee: SABIC AGRI-NUTRIENTS COMPANY, Riyadh (SA)

( * ) Notice: Subject to any disclaimer, the term of this patent is extended or adjusted under 35 U.S.C. 154(b) by 659 days.

(21) Appl. No.: 18/005,388

(22) PCT Filed: Jul. 13, 2021

(86) PCT No.: PCT/IB2021/056304
§ 371 (c)(1),
(2) Date: Jan. 13, 2023

(87) PCT Pub. No.: WO2022/013747
PCT Pub. Date: Jan. 20, 2022

(65) Prior Publication Data
US 2023/0271895 A1 Aug. 31, 2023

(30) Foreign Application Priority Data

Jul. 14, 2020 (IN) .............................. 202011029906

(51) Int. Cl.
*C05G 1/00* (2006.01)
*A01C 21/00* (2006.01)
(Continued)

(52) U.S. Cl.
CPC ................ *C05G 1/00* (2013.01); *A01C 21/00* (2013.01); *C05B 17/00* (2013.01); *C05B 19/00* (2013.01);
(Continued)

(58) Field of Classification Search
CPC .. C05G 1/00; C05G 5/12; A01C 21/00; C05B 17/00; C05B 19/00; C05D 1/005; C05D 9/00
See application file for complete search history.

(56) References Cited

U.S. PATENT DOCUMENTS 2,710,795 A * 6/1955 Douglas ..................... B01J 2/12
264/117
2,722,456 A 11/1955 Glessner
(Continued)

FOREIGN PATENT DOCUMENTS

AU 2006207855 3/2007
AU 2018201274 3/2018
(Continued)

OTHER PUBLICATIONS

International Search Report and Written Opinion issued in corresponding PCT Application No. PCT/IB2021/056304, mailed Oct. 6, 2021.
(Continued)

*Primary Examiner* — Wayne A Langel
(74) *Attorney, Agent, or Firm* — Norton Rose Fulbright US LLP

(57) ABSTRACT

Methods for producing solid acidic fertilizer granules, solid acidic fertilizer granules, and methods for their use in fertigation, are disclosed. The method can include providing a plant nutrient containing nitrogen (N), phosphorus (P) and optionally potassium (K), in a container; feeding an acid solution containing an inorganic acid into the container at a feeding rate comprising an average feed rate of 0.2 to 0.8 metric ton of the inorganic acid (MTacid) per hour per metric ton of the plant nutrient (MTnutrient) (MT acid.h−1.MT nutrient−1) and contacting the inorganic acid and the plant nutrient to obtain acidified granules with average
(Continued)

200 moisture content of 0.5 wt. % to 1.0 wt. %; and drying the acidified granules to obtained dried acidic granules.

20 Claims, 2 Drawing Sheets

(51) Int. Cl.

| | |
|---|---|
| *C05B 17/00* | (2006.01) |
| *C05B 19/00* | (2006.01) |
| *C05D 1/00* | (2006.01) |
| *C05D 9/00* | (2006.01) |
| *C05G 5/12* | (2020.01) |

(52) U.S. Cl.
CPC .............. *C05D 1/005* (2013.01); *C05D 9/00* (2013.01); *C05G 5/12* (2020.02)

(56) References Cited

U.S. PATENT DOCUMENTS

| | | | |
|---|---|---|---|
| 2,909,002 | A | 10/1959 | Hendry |
| 3,223,518 | A | 12/1965 | Hansen |
| 3,313,615 | A | 4/1967 | Formaini |
| 3,392,007 | A | 7/1968 | Hopewell et al. |
| 3,419,379 | A | 12/1968 | Goodale et al. |
| 3,580,715 | A | 5/1971 | Dilday |
| 3,666,523 | A | 5/1972 | Nau |
| 3,697,245 | A | 10/1972 | Dilday |
| 3,938,469 | A | 2/1976 | Nau |
| 4,042,366 | A | 8/1977 | Fersch et al. |
| 4,594,090 | A | 6/1986 | Johnson |
| 4,723,710 | A | 2/1988 | Lucore, II |
| 4,917,304 | A | 4/1990 | Mazzei et al. |
| 5,152,821 | A | 10/1992 | Walter |
| 5,851,260 | A | 12/1998 | Aijala et al. |
| 5,917,110 | A | 6/1999 | Kust |
| 6,029,904 | A | 2/2000 | Taylor |
| 6,030,659 | A | 2/2000 | Whitehurst et al. |
| 6,159,263 | A | 12/2000 | Greer et al. |
| 6,413,291 | B1 | 7/2002 | Wommack et al. |
| 7,393,885 | B2 | 7/2008 | Kiyokawa et al. |
| 8,506,670 | B2 | 8/2013 | Varadachari |
| 8,721,758 | B1 | 5/2014 | Miller et al. |
| 9,004,374 | B1 | 4/2015 | Gans |
| 9,073,795 | B2 | 7/2015 | Bergevin et al. |
| 9,199,883 | B2 | 12/2015 | Peacock et al. |
| 9,439,345 | B1 | 9/2016 | Miller et al. |
| 9,487,452 | B2 | 11/2016 | Ledoux |
| 9,586,869 | B1 | 3/2017 | Burnham et al. |
| 9,688,586 | B1 | 6/2017 | Roa-Espinosa et al. |
| 9,856,179 | B2 | 1/2018 | Miller et al. |
| 11,155,503 | B2 | 10/2021 | Sharma |
| 2002/0186614 | A1 | 12/2002 | Millward |
| 2005/0144997 | A1 | 7/2005 | Phillips et al. |
| 2006/0254331 | A1 | 11/2006 | Burnham |
| 2007/0131009 | A1 | 6/2007 | Westbrook et al. |
| 2009/0145190 | A1 | 6/2009 | Persinger |
| 2010/0273885 | A1 | 10/2010 | Davis |
| 2010/0291230 | A1 | 11/2010 | Assaraf et al. |
| 2011/0079062 | A1 | 4/2011 | Smith |
| 2012/0067094 | A1 | 3/2012 | Pursell et al. |
| 2014/0238514 | A1 | 8/2014 | Yarbrough et al. |
| 2014/0352376 | A1 | 12/2014 | Carpenter |
| 2015/0027042 | A1 | 1/2015 | Goodwin et al. |
| 2015/0210604 | A1 | 7/2015 | Ledoux |
| 2015/0239790 | A1 | 8/2015 | Iwig et al. |
| 2016/0060460 | A1 | 3/2016 | Welch |
| 2016/0073578 | A1 | 3/2016 | Khaleel |
| 2016/0075607 | A1 | 3/2016 | Agel et al. |
| 2016/0229763 | A1 | 8/2016 | Wheeler et al. |
| 2016/0318820 | A1 | 11/2016 | Deb |
| 2017/0044078 | A1 | 2/2017 | Mclaughlin et al. |
| 2017/0066692 | A1 | 3/2017 | Ledoux |
| 2017/0066693 | A1 | 3/2017 | Ledoux |
| 2018/0222810 | A1 | 8/2018 | Schumski |
| 2018/0370864 | A1 | 12/2018 | Ledoux |
| 2019/0194084 | A1 | 6/2019 | Khaleel |
| 2019/0225557 | A1 | 7/2019 | Colpaert et al. |
| 2019/0382321 | A1 | 12/2019 | Garnier et al. |
| 2020/0131098 | A1 | 4/2020 | Hedge et al. |

FOREIGN PATENT DOCUMENTS

| | | | | |
|---|---|---|---|---|
| CA | 2995400 | | 2/2017 | |
| CH | 497353 | A | 10/1970 | |
| CH | 425702 | | 12/1996 | |
| CN | 1292367 | | 4/2001 | |
| CN | 1403418 | | 3/2003 | |
| CN | 1609072 | | 4/2005 | |
| CN | 1830919 | | 9/2006 | |
| CN | 1875688 | | 12/2006 | |
| CN | 100407898 | | 12/2006 | |
| CN | 101077844 | | 11/2007 | |
| CN | 101503330 | | 8/2009 | |
| CN | 201773293 | | 3/2011 | |
| CN | 102372523 | | 3/2012 | |
| CN | 102432403 | | 5/2012 | |
| CN | 102515905 | | 6/2012 | |
| CN | 102775217 | | 11/2012 | |
| CN | 103848683 | | 6/2014 | |
| CN | 104130043 | | 11/2014 | |
| CN | 104557337 | | 4/2015 | |
| CN | 105143150 | | 12/2015 | |
| CN | 105367235 | | 3/2016 | |
| CN | 105473534 | | 4/2016 | |
| CN | 105819943 | | 8/2016 | |
| CN | 105949010 | | 9/2016 | |
| CN | 106116854 | | 11/2016 | |
| CN | 106187503 | | 12/2016 | |
| CN | 106187549 | | 12/2016 | |
| CN | 206375831 | | 8/2017 | |
| CN | 108137429 | | 6/2018 | |
| CN | 108191491 | | 6/2018 | |
| CN | 109641813 | | 4/2019 | |
| CN | 106414373 | | 6/2020 | |
| DE | 102009026234 | | 2/2011 | |
| DE | 102016116633 | A1 * | 3/2018 | ............... C05D 9/00 |
| EP | 0949221 | | 10/1999 | |
| EP | 1080054 | | 12/2003 | |
| EP | 1473992 | | 11/2004 | |
| EP | 1486477 | | 12/2004 | |
| EP | 1770079 | | 4/2007 | |
| EP | 3330241 | | 6/2018 | |
| FR | 2682554 | | 4/1993 | |
| FR | 2686861 | | 8/1993 | |
| GB | 954423 | | 4/1964 | |
| JP | 2002316888 | | 10/2002 | |
| RU | 2010024 | C1 | 3/1994 | |
| RU | 2412140 | | 2/2011 | |
| WO | WO 1993/010062 | | 5/1993 | |
| WO | WO 1999/015480 | | 4/1999 | |
| WO | WO 2001/025168 | | 4/2001 | |
| WO | WO 2012/064730 | | 5/2012 | |
| WO | WO 2014/033160 | | 3/2014 | |
| WO | WO 2014/177932 | | 11/2014 | |
| WO | WO 2015/001391 | | 1/2015 | |
| WO | WO 2015/132258 | | 9/2015 | |
| WO | WO 2016/030584 | | 3/2016 | |
| WO | WO 2017/013572 | | 1/2017 | |
| WO | WO 2017/081183 | | 5/2017 | |
| WO | WO 2017/198693 | | 11/2017 | |
| WO | WO 2018/042312 | | 3/2018 | |
| WO | WO 2018/211448 | | 11/2018 | |
| WO | WO 2020/000022 | | 1/2020 | |
| WO | WO 2020/104914 | | 5/2020 | |
| WO | WO 2020/121222 | | 6/2020 | |

OTHER PUBLICATIONS

Communication pursuant to Article 94(3) EPC issued in corresponding European Application No. 19824011.1, dated Jan. 2, 2024.

(56) References Cited

OTHER PUBLICATIONS

Kant, S. et al., "Fertigation", *Reference Module in Earth Systems and Environmental Sciences*, 2013.

Office Action Search Report issued in corresponding U.S. Appl. No. 17/295,096, dated Jan. 3, 2024.

"Monoammonium Phosphate (MAP)." Crop Nutrition, Sep. 21, 2020, https://www.cropnutrition.com/resource-library/monoammonium-phosphate-map.

"NPK Fertilizers—Mixed Acid Route." Lecture Book from NPTEL programme, https://nptel.ac.in/courses/103/107/103107086/. Accessed Jun. 16, 2021. 9 pages.

"Poly-Feed pHast—Soluble NPK Fertilizers with low pH." Haifa Group, https://www.haifa-group.com/poly-feed%E2%84%A2-phast, Date Accessed: Sep. 2, 2020.

"Production of NPK Fertilizers by the Mixed Acid Route," *European Fertilizer Manufactures Association,* 2000, Booklet No. 8, 1-36.

"Sulfuric Acid." Chemical Book, Jan. 16, 1998, https://www.chemicalbook.com/ChemicalProductProperty_EN_CB9675634.hlm.

Brown, Brad et al. "Nutrient Management for Field Corn Silage and Grain in the Inland Pacific Northwest". University of Idaho. PNW 615 (Feb. 2010) (Year: 2010).

Burt, "Chemicals for Fertigation," Proc Intl. Irrigation Show: IA's 19th Annual Conference, 1998, 8 pages.

Database WPI; Week 200311 Thomson Scientific, London, GB; AN 2003-116042.

House, "Phosphorus, Arsenic, Antimony, and Bismuth," *Inorganic Chemistry,* 2013, 2:493.

International Search Report and Written Opinion issued in International Patent Application No. PCT/IB2014/001392, dated Dec. 10, 2014.

International Search Report and Written Opinion issued in International Patent Application No. PCT/IB2017/055158, dated Nov. 24, 2017.

International Search Report and Written Opinion issued in International Patent Application No. PCT/IB2018/053475, dated Aug. 1, 2018.

International Search Report and Written Opinion issued in International Patent Application No. PCT/IB2019/059888, dated Feb. 20, 2020.

International Search Report and Written Opinion issued in International Patent Application No. PCT/IB2019/060671, dated Mar. 10, 2020.

International Search Report and Written Opinion issued in International Patent Application No. PCT/IB2021/061966, dated Mar. 17, 2022.

Mosaic, "MicroEssentials SZ" MSDS Revised, dated Dec. 21, 2012.

The Berkey "What Is The pH Level Of Water? For Tap, Pure, And Filtered Drinking Water". <https://theberkey.com/blogs/water-filter/why-ph-level-in-your-water-matters> Feb. 22, 2020 (Year: 2020).

Vitosh, M. L. NPK fertilizers. Cooperative Extension Service, Michigan State University, 1990. (Year: 1990).

* cited by examiner

ACIDIFIED FERTILIZER GRANULES

CROSS REFERENCE TO RELATED PATENT APPLICATIONS

This application is a national phase application under 35 U.S.C. § 371 of International Application No. PCT/IB2021/056304, filed Jul. 13, 2021, which claims priority to and the benefit of priority of Indian Provisional Application No. 202011029906, filed Jul. 14, 2020, which is hereby incorporated by reference in its entirety.

BACKGROUND OF THE INVENTION

A. Field of the Invention

The invention generally concerns a method for making an acidified fertilizer. More specifically, the method include contacting an inorganic acid with a plant nutrient containing nitrogen, phosphorus, and optionally potassium at a controlled rate to produce solid acidified fertilizer granules.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients and to create the right balance of nutrients.

Conventionally, fertilizers can be distributed in the soil by the drop-fertilizing method which applies fertilizer granules or powder directly into the soil. By comparison, fertigation, a method widely employed in commercial agriculture and horticulture, applies fertilizer through the irrigation system by dissolving fertilizers directly in the irrigation system. Advantages of fertigation include increased nutrient absorption by plants, accurate placement of nutrients, reduction of fertilizer consumption, reduction of soil erosion, and reduction of energy needed for applying the solid fertilizers. However, most conventional NP (nitrogen-phosphorus), PK (phosphorus-potassium), and NPK (nitrogen-phosphorus-potassium) fertilizers do not fully dissolve in irrigation water with high pH values (pH>7.5) and/or more than 50 ppm calcium content. The phosphorus of the fertilizer can react with the calcium in the water to form an insoluble calcium phosphate complex under high pH conditions. This reduced solubility can result in uneven distribution of the fertilizer in the water. Further, the formation of insoluble calcium phosphate complexes can result in particulate buildup in the irrigation system, which can lead to clogging and ultimately reduced effectiveness or failure of the system to deliver the water and fertilizer to the soil or plants.

Several methods have been developed to improve the solubility of conventional fertilizers in high-pH irrigation water. U.S. Publication No. 2016/0073578 A1 discloses a method for fertigation that includes adding an acidic fertilizer-dissolving agent, including inorganic acids, into water, and then dissolving fertilizer in the water. However, this method requires a step of mixing the water with acid, which may increase the operational cost. Furthermore, direct handling of concentrated inorganic acid including sulfuric acid, hydrochloric acid, nitric acid, or phosphoric acid, can increase safety concerns. Moreover, the reaction of the inorganic acid with the plant nutrient in irrigation water may result in the need for re-determination of the final nutrient ratios in the fertigation solution, increasing the operational cost and time required to prepare a proper fertigation solution.

PCT application No. WO 2018/042312, Japanese Publication No. 2002/316888A, and CA 2995400 each disclose granular fertilizer compositions that include a fertilizer core and an outer coating that contains an inorganic acid. However, high concentrations of inorganic acid on the outer surface of the granular fertilizer can result in absorption of atmospheric water, can increase the safety concerns of handling these granules, and can increase the cost and complexity of keeping these fertilizer granules dry when they are in storage.

Further addition of large amounts, e.g., 4 wt. % or more, of inorganic acid in NPK (nitrogen-phosphorus-potassium) fertilizers during product formulation can create operational problems and health hazards, so normally less than 4 wt. % of inorganic acid, e.g., sulfuric acid, is used with NPK fertilizers, for example see Japanese Publication No. 2002/316888A. However addition of lower amounts of acid and/or dilute acid solution might create additional problems. For example, lower amounts of acid might not fully solubilize the NPK fertilizer in water. Additionally addition of diluted acid solution, during fertilizer granule formation might create operational problems such as lump formation and caking in the fertilizer production system, creating issues with large scale production of the acidified fertilizers.

SUMMARY OF THE INVENTION

A solution to at least some of the above-mentioned problems associated with making an acidified fertilizer composition has been discovered. In particular a method for producing plant fertilizers containing up to 40 wt. % of an inorganic acid has been discovered. The method includes controlled addition of a concentrated inorganic acid solution, e.g., containing 50 wt. % or higher of an acid, to a nitrogen (N), phosphorus (P), and optionally potassium (K), containing plant nutrient. In a preferred instance the plant nutrient is provided in a granulator and the concentrated inorganic acid solution is added to the granulator at a controlled rate to form acidified plant fertilizer composition containing solid acidified granules. As illustrated in a non-limiting manner in Example 1, methods of the present invention result in relatively less caking and lump formation and can be used for producing acidified fertilizer granules containing relatively high amounts of acid. Granulator units used for producing plant fertilizers are typically internally lined with inorganic acid resistant rubber. Thus addition of inorganic acid directly to the granulator results in relatively less corrosion, e.g. to the apparatus used for plant fertilizer production, compared to methods where the acid, e.g. liquid acid, is added in the plant fertilizer production process at a pre-granulation or a post-granulation stage(s). Further, in some embodiments, apparatus or parts of the plant fertilizers production system other than the granulator may not directly contact the liquid acid. Thus, relatively less protection of those parts may be necessary, which provides an economic advantage to the methods of the current invention compared to process where apparatus or parts other than the granulator also need to be protected, e.g. with expensive protective covering, from liquid acid corrosion.

One aspect is directed to a method for producing a plant fertilizer containing solid acidic fertilizer granules. In some aspects, the method can be a batch method. The method, e.g., the batch method, can include any one of, any combination of or all of steps (a)-(c). In step (a), a plant nutrient containing nitrogen (N), phosphorus (P), and optionally potassium (K), can be provided in a container. In some aspects, the container can be a granulator. In some aspects, the container, e.g., the granulator, can be internally lined with an acid resistant coating and/or can be made of acid resistant material. In some aspects, the acid resistant coating and/or the container material can contain an acid resistant rubber and/or plastic. In step (b) an acid solution containing an inorganic acid can be fed to the container at an average feed rate of 0.2 to 0.8 metric ton of the inorganic acid (MT acid) per hour (h) per metric ton of the plant nutrient (MT nutrient), (MT acid.h$^{-1}$.MT nutrient$^{-1}$) in the container. In step (b) the inorganic acid and the plant nutrient can be contacted to obtain acidified granules with average moisture content of 0.5% to 1.0 wt. %. In step (c) the acidified granules can be dried to obtained dried acidic granules. In some aspects, the acidified granules can be dried in a dryer.

The container for mixing the acid solution and the plant nutrient, e.g., granulator, and the dryer can be the same or different containers. In some aspects, the acid solution can be fed to the container for a duration of 1 to 5 hours. The acid solution feeding rate in step (b) can include a first feeding rate for a first duration and a second feeding rate different than the first for a second duration, resulting in the average feed rate of step (b). In some aspects, the first feeding rate can be 0.01 to 0.25 MT acid.h$^{-1}$.MT nutrient$^{-1}$ and/or the first duration can be 0.5 to 3 h. In some aspects, the second feeding rate can be 0.3 to 1 MT acid.h$^{-1}$.MT nutrient$^{-1}$ and/or the second duration can be 0.5 to 2 h. The acid solution feeding rate in step (b) can be increased from the first feeding rate to the second feeding rate at a ramping rate of 1 to 3 MT acid.h$^{-1}$.MT nutrient$^{-1}$ per hour (MT acid.h$^{-2}$.MT nutrient$^{-1}$). In some aspects, a second plant nutrient can be added to step (b). The second plant nutrient can be same as, e.g., have similar chemical composition, as the plant nutrient, or the dried acidic granules, or the second plant nutrient can be different than both, or it can be a combination thereof. The plant nutrient provided in step (a) and the second plant nutrient added in step (b) can have a weight ratio of 1:1 to 5:1.

The acidified granules can be dried at a temperature of 55° C. to 95° C., preferably of 60° C. to 80° C. In some instances, the drying step can transform the granules from an amorphous solid, such as paste, to a solid. The dried acidic granules can have a moisture content of 0.05 wt. % to less than 1 wt. %, preferably 0.05 wt. % to 0.8 wt. %. The average size, e.g., diameter, of the dried acidic granules can be 1 to 4 mm. In some aspects, the method can further include step (d), and in step (d) the dried acidic granules can be passed through a size screen to obtain dried acidic granules of desired size. In some aspects, at least a portion of the dried acidic granules having a size smaller and/or larger than the desired size can be recycled to step (b), e.g., step (b) of a later batch. In some aspects, the dried acidic granules with size larger than the desired size can be ground prior to recycling to step (b). In some aspects, the desired size can be 1 mm to 4 mm. Methods of the present inventions result in relatively lower amounts of cake/lump formation, e.g., 20 wt. % or less of the acidified granules produced in step (b) form lumps/cakes of size greater than 4 mm, and/or 10 wt. % of less of the dried acidic granules produced in step (c) have a size greater than 4 mm.

The plant nutrient can contain nitrogen (N):phosphorus (P):potassium (K) at a weight ratio of 5 to 20:3 to 40:0 to 30. In some aspects, the plant nutrient can contain one or more N source, one or more P source, optionally one or more potassium K source, optionally water, and optionally a binder. The optional binder can be triple super phosphate (TSP), guar gum, waxes such as paraffin wax, oils such as linseed oils and paraffin oils, flours and starches such as bleached wheat flour, gelatins, and/or polymers. In some particular aspects, the plant nutrient can contain N:P:K (NPK grade) at a weight ratio of about 7:19:12, about 9:25:7, about 10:5:10, about 18:18:0, about 13:13:13, about 10:19:10, about 10:10:20, about 8:15:8, about 11:6:17, about 8:8:23, about 10:10:10, about 8:5:26, about 6:16:6, about 6:29:6, about 10:5:15, about 11.5:11.5:11.5, about 18:9:9, about 8:26:8, about 12:12:12, about 12:30:0, about 7:34:0, or about 12:12:4. In some non-limiting instances, the term "about" is defined to be within 10%, 9%, 8%, 7%, 6%, 5%, 4%, 3%, 2%, 1%, or 0.5%.

In some aspects, the plant nutrient and/or the second plant nutrient can further contain one or more additional ingredient. Additional ingredients can include a preservative, insecticide, fungicide, fragrance, fertilizer, plant growth agent, nutrient, trace element, plant protection agent, filler, micronutrients, secondary nutrients, flow promotors, binders, pH adjusters or buffers, etc., or any combinations thereof. In some instances, the plant nutrient and/or the second plant nutrient does not contain one or more of the additional ingredients. The plant nutrient can contain any amount of additional ingredients, such as 0.001 wt. % to 50 wt. %, 0.001 wt. % to 40 wt. %, 0.001 wt. % to 30 wt. %, 0.001 wt. % to 20 wt. %, 0.01 wt. % to 10 wt. %, 0.01 wt. % to 9 wt. %, 0.01 wt. % to 8 wt. %, 0.01 wt. % to 7 wt. %, or any range or value therein. In some instances, the plant nutrient can contain 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, or 40 wt. % of additional ingredients. The second plant nutrient can contain any amount of additional ingredients, such as 0.001 wt. % to 100 wt. %, 0.001 wt. % to 90 wt. %, 0.001 wt. % to 80 wt. %, 0.001 wt. % to 70 wt. %, 0.01 wt. % to 60 wt. %, 0.001 wt. % to 50 wt. %, 0.001 wt. % to 40 wt. %, 0.001 wt. % to 30 wt. %, 0.001 wt. % to 20 wt. %, 0.01 wt. % to 10 wt. %, 0.01 wt. % to 9 wt. %, 0.01 wt. % to 8 wt. %, 0.01 wt. % to 7 wt. %, or any range or value therein.

The inorganic acid solution can be a concentrated acid solution, e.g., can contain 50 wt. % or higher, 60 wt. % or higher, 70 wt. % or higher, 80 wt. % or higher, 90 wt. % or higher, or 95 wt. % or higher of the inorganic acid. In some aspects, the inorganic acid can be sulfuric acid, hydrochloric acid, nitric acid, or phosphoric acid, or any combination thereof, preferably sulfuric acid. In some aspects, the acid solution can contain 95 wt. % to 98 wt. % of sulfuric acid.

In some instances, the method can further include coating the dried acidic granules of desired size with a coating that contains one or more of water, one or more solubilizing agent(s), one or more binder(s), and/or one or more anticaking agent(s) to obtain fertilizer granule containing a coating. In some instances, the coating does not contain an inorganic acid. The coating can, in some instances, contain one or more binder(s) and/or one or more anticaking agent(s). In some instances, the water contained in the coating can be less than 5% by weight of the coating. Such a coating with reduced water or moisture content can be considered a dried or dry coating. In some instances, the water content of the coating is 4 wt. %, 3 wt. %, 2 wt. %, 1 wt. %, or less, compared to the weight of the coating. The solubilizing agent can be Na$_2$CO$_3$, NaOH, KOH, Ca(OH)$_2$, Mg(OH)$_2$, and/or K$_2$CO$_3$. The binder can be triple super phosphate (TSP), guar gum, waxes such as paraffin wax, oils such as linseed oils and paraffin oils, flours and starches such as bleached wheat flour, gelatins, and/or polymers. The anticaking agent can be any anticaking agent known, such as surfactants, amines, liquid carriers such as oil and/or water, and/or a URESOFT® product supplied by Kao Chemicals, such as URESOFT®-125, or any combination thereof. In embodiments of the invention, the coating can contain the components therein at any concentration, ratio, percent by weight, percent by volume, etc.

In some instances, the method can further include blending or compounding the plant fertilizer with an additional fertilizer.

One aspect is directed to a plant fertilizer obtained by a method of the present invention. The plant fertilizer can contain 2 wt. % to 40 wt. %, preferably 4 wt. % to 36 wt. %, more preferably 10 wt. % to 35 wt. %, of an inorganic acid. In some aspects, the inorganic acid can be 2 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, or 40 wt. %, or any range thereof, by weight of the plant fertilizer e.g., of the fertilizer granules. Non-limiting examples of the inorganic acid may include sulfuric acid, hydrochloric acid, nitric acid, or phosphoric acid, or any combination thereof. In some particular aspects, the inorganic acid can be sulfuric acid. In some aspects, the plant fertilizer can contain nitrogen (N):phosphorus (P):potassium (K):sulfur (S) at a weight ratio of 5 to 20:3 to 40:0 to 30:3 to 25. In some particular aspects, the plant fertilizer can have a N:P:K:S (nitrogen:phosphorus:potassium:sulfur) ratio (NPKS grade or NPK+S grade) by weight of about 7:19:12:15, about 7:19:12:10, about 9:25:7:8, about 10:5:10:10, about 18:18:0:6, about 13:13:13:11, about 10:19:10:10, about 10:10:20:13, about 8:15:8:9, about 11:6:17:12, about 8:8:23:14, about 10:10:10:10, about 8:5:26:15, about 6:16:6:8, about 6:29:6:8, about 10:5:15:12, about 11.5:11.5:11.5:9.8, about 18:9:9:9, about 8:26:8:9, about 12:12:12:10, about 12:30:0:6, about 7:34:0:6, or about 12:12:4:8. In some non-limiting instances, the term "about" is defined to be within 10%, 9%, 8%, 7%, 6%, 5%, 4%, 3%, 2%, 1%, or 0.5%. The plant fertilizer can optionally contain one or more of additional ingredient(s).

The plant fertilizer can contain solid acidic fertilizer granules, e.g., the dried acidic granules, having an average crush strength of 2 to 10 kg/granule, or 3 to 7 kg/granule, or 4 to 6 kg/granule. The plant fertilizer can form a solution having a pH of less than 4, preferably less than 3.5, more preferably less than 3, such as 1 to 3, when 10 grams of the plant fertilizer is dissolved under ambient condition in 100 ml of water, wherein the water has a pH of 7 or greater before the plant fertilizer is dissolved in the water. In some instances, the plant fertilizer can include an effective amount of the inorganic acid sufficient to form a solution having a pH of less than 3.5, less than 3, less than 2.5, less than 2, less than 1.5, or less than 1. In some instances, the plant fertilizer can include an effective amount of the inorganic acid sufficient to form the solution when at most 9 grams, at most 8 grams, at most 7 grams, at most 6 grams, at most 5 grams, at most 4 grams, at most 3 grams, at most 2 grams, or at most 1 gram of the solid fertilizer granule(s) is dissolved. In some instances, the plant fertilizer can be dissolved in at least 150 ml, at least 200 ml, at least 300 ml, at least 400 ml, at least 500 ml, at least 600 ml, at least 700 ml, at least 800 ml, at least 900 ml, at least 1000 ml, at least 2000 ml, or at least 3000 ml, etc. of water to form the solution. In some instances the water, before the plant fertilizer is dissolved in the water, has a pH of greater than 7.5, greater than 8.0, greater than 8.5, greater than 9.0, greater than 9.5, greater than 10.0, greater than 10.5, greater than 11.0, or greater than 11.5, etc. In some aspects, the water can contain at least 50 ppm calcium ($Ca^{2+}$). In some instances, the water contains at least 100 ppm, at least 150 ppm, at least 200 ppm, at least 250 ppm, at least 300 ppm, at least 350 ppm, at least 400 ppm, at least 450 ppm, at least 500 ppm, at least 550 ppm, at least 600 ppm, at least 650 ppm, at least 700 ppm, at least 750 ppm, at least 800 ppm, at least 850 ppm, at least 900 ppm, at least 950 ppm, at least 1000 ppm, at least 1500 ppm, at least 2000 ppm, at least 2500 ppm, at least 3000 ppm, at least 3500 ppm, or at least 4500 ppm, etc. calcium.

Also disclosed in the context of the present invention are fertilizer blends or compounded fertilizers containing a plant fertilizer, e.g., fertilizer granule, produced according to the methods of the present invention and an additional fertilizer. The additional fertilizer can be, but is not limited to, nitrogen and phosphorus (NP), phosphorus and potassium (PK), nitrogen, phosphorus, and potassium (NPK), urea, diammonium phosphate (DAP), monoammonium phosphate (MAP), single superphosphate (SSP), triple super-phosphate (TSP), or a combination thereof. In one aspect, the additional fertilizer can include an inorganic acid. In other aspects, however, the additional fertilizer does not include an inorganic acid.

Also disclosed in the context of the present invention are methods of fertigation. In some aspects, the method of fertigation may include combining the solid acidic fertilizer granule or the fertilizer blend with water to form a fertigation solution having a pH less than 4. In some instances, the method optionally includes combining the fertigation solution with additional water to form a fertilizer solution. In some instances, the method optionally includes applying the fertigation solution or the fertilization solution to a crop. In some aspects of the invention, combining the fertilizer granule to the water decreases the pH of the water from a pH of 4 or greater to a pH of less than 4, less than 3.5, less than 3, less than 2.5, less than 2, less than 1.5, or less than 1. In some instances, the combining the fertilizer granule to the water decreases the pH of the water to a pH of less than 4 from a pH of 6.5 or greater, 7.0 or greater, 7.5 or greater, 8.0 or greater, 8.5 or greater, 9.0 or greater, 9.5 or greater, 10.0 or greater, 10.5 or greater, 11.0 or greater, or 11.5 or greater, or 6.5 to 11.5, or greater than 7.0 to 10, or greater than 7.0 to 9, or greater than 7.0 to 8.5. In one aspect, the applying step can include applying the fertigation solution or the fertilization solution to at least one of a soil, an organism, a crop, a liquid carrier, a liquid solvent, or a combination thereof. Application of the fertigation solution or the fertilization solution can promote plant growth and/or plant health.

In some aspects, the water used to form the fertigation solution or fertilizer solution can contain at least 50 ppm of calcium ($Ca^{2+}$). In some instances, the water comprises more than 100 ppm of calcium ($Ca^{2+}$), more than 200 ppm of calcium, more than 300 ppm of calcium, more than 400 ppm of calcium, more than 500 ppm of calcium, more than 600 ppm of calcium, more than 700 ppm of calcium, more than 800 ppm of calcium, more than 900 ppm of calcium, more than 1,000 ppm of calcium, more than 1,500 ppm of calcium, more than 2,000 ppm of calcium, more than 2,500 ppm of calcium, more than 3,000 ppm of calcium, more than 3,500 ppm of calcium, or more than 4,000 ppm of calcium. In some aspects, the water comprises at least 50 ppm of $Ca^{2+}$ to 1000 ppm of $Ca^{2+}$, or at least 50 ppm $Ca^{2+}$ to 500 ppm of $Ca^{2+}$, or at least 50 ppm of $Ca^{2+}$ to 250 ppm $Ca^{2+}$, or at least 50 ppm $Ca^{2+}$ to 150 $Ca^{2+}$.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea, such as urea granules.

The terms "about," "approximately," and "substantially" are defined as being close to, as understood by one of ordinary skill in the art. In one non-limiting instance, the terms are defined to be within 10%, preferably within 5%, more preferably within 1%, and most preferably within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The compositions and process of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the solid acidic fertilizer of the present invention is that the solid acidic fertilizer contains inorganic acid that is distributed throughout the solid fertilizer granule.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

In the context of the present invention, at least the following 20 aspects are described.

Aspect 1 is directed to a method for preparing a plant fertilizer comprising solid acidic fertilizer granules, the method comprising:
(a) providing a plant nutrient comprising nitrogen (N), phosphorus (P) and optionally potassium (K), in a container;
(b) feeding an acid solution comprising an inorganic acid into the container at a feeding rate comprising an average feed rate of 0.2 to 0.8 metric ton of the inorganic acid (MTacid) per hour per metric ton of the plant nutrient (MTnutrient) (MT $acid.h^{-1}.MT$ $nutrient^{-1}$) and contacting the inorganic acid and the plant nutrient to obtain acidified granules with average moisture content of 0.5% to 1.0%; and
(c) drying the acidified granules to obtained dried acidic granules.

Aspect 2 is directed to the method of aspect 1, wherein in step (b) the acid solution comprising an inorganic acid is fed into the container for a duration of 1 to 5 hours.

Aspect 3 is directed to the method of aspects 1 or 2, wherein the feeding rate in step (b) comprises a first feed rate of 0.01 to 0.25 MT $acid.h^{-1}.MT$ $nutrient^{-1}$ for a first duration and a second feed rate of 0.3 to 1 MT $acid.h^{-1}.MT$ $nutrient^{-1}$ nutrient for a second duration.

Aspect 4 is directed to the method of aspect 3, wherein the first duration is 0.5 hours to 3 hours, and/or the second duration is 0.5 hours to 2 hours.

Aspect 5 is directed to the method of aspects 3 or 4, wherein the feeding rate is increased from the first feed rate to the second feed rate at a ramping rate of 1 MT $acid.h^{-1}.MT$ $nutrient^{-1}$ per hour (MT $acid.h^{-2}.MT$ $nutrient^{-1}$) to 3 MT $acid.h^{-2}.MT$ $nutrient^{-1}$.

Aspect 6 is directed to the method of any one of aspects 1 to 5, wherein step (b) further comprises adding a second plant nutrient, wherein the second plant nutrient is the same as the plant nutrient, is the same as the dried acidic granules, or is different than the plant nutrient and the dried acidic granules, or a combination thereof.

Aspect 7 is directed to the method of aspect 6, wherein the plant nutrient and the second plant nutrient has a weight ratio of 1:1 to 5:1.

Aspect 8 is directed to the method of any one of aspects 1 to 7, wherein the plant nutrient comprises nitrogen (N):phosphorus (P):potassium (K) at a weight ratio of 5 to 20:3 to 40:0 to 30.

Aspect 9 is directed to the method of any one of aspects 1 to 8, wherein the plant nutrient and/or the second plant nutrient consists of one or more N source, one or more P source, optionally one or more potassium K source, optionally water, and optionally a binder.

Aspect 10 is directed to the method of any one of aspects 1 to 9, wherein the inorganic acid is sulfuric acid, hydrochloric acid, nitric acid, or phosphoric acid, or any combination thereof, preferably sulfuric acid.

Aspect 11 is directed to the method of any one of aspects 1 to 10, wherein the acid solution comprises 95 wt. % to 98 wt. % of sulfuric acid.

Aspect 12 is directed to the method of any one of aspects 1 to 11, wherein the acidified granules are dried at a temperature of 55° C. to 95° C., preferably of 60° C. to 80° C.

Aspect 13 is directed to the method of any one of aspects 1 to 12, wherein the dried acidic granules have a moisture content of 0.05 wt. % to less than 1 wt. %, preferably 0.05 wt. % to 0.8 wt. % and/or an average size distribution of 1 mm to 4 mm.

Aspect 14 is directed to the method of any one of aspects 1 to 13, wherein the method further comprises:

(d) passing the dried acidic granules through a size screen to obtain dried acidic granules of desired size.

Aspect 15 is directed to a plant fertilizer comprising solid acidic fertilizer granules obtained by a method of any one of aspects 1 to 14.

Aspect 16 is directed to the plant fertilizer of aspect 15, wherein the plant fertilizer comprises 2 wt. % to 40 wt. %, preferably 4 wt. % to 36 wt. %, more preferably 10 wt. % to 35 wt. %, of the inorganic acid and/or wherein the plant fertilizer comprises a nitrogen (N):phosphorus (P):potassium (K):sulfur (S) weight ratio of 5 to 20:3 to 40:0 to 30:3 to 25.

Aspect 17 is directed to the plant fertilizer of any one of aspects 15 to 16, wherein the solid acidic fertilizer granules have an average crush strength 2 to 10 kg/granule, or 3 to 7 kg/granule, or 4 to 6 kg/granule.

Aspect 18 is directed to the plant fertilizer of any one of aspects 15 to 17, wherein the solid acidic fertilizer granules are capable of forming a solution having a pH of less than 4, preferably less than 3, when 10 grams of the plant fertilizer is dissolved under ambient condition in 100 ml of water, wherein the water has a pH of 7 or greater before the plant fertilizer is dissolved in the water.

Aspect 19 is directed to the plant fertilizer of any one of aspects 15 to 18, wherein the plant fertilizer is comprised in a fertilizer blend or a compounded fertilizer comprising the plant fertilizer and an additional fertilizer.

Aspect 20 is directed to a method of fertilizing, the method comprising applying a plant fertilizer made according to the methods of any one of aspects 1 to 14 or a plant fertilizer of any one of aspects 15 to 19 to at least a portion of a soil, a crop, or the soil and the crop.

BRIEF DESCRIPTION OF THE DRAWINGS

Advantages of the present invention may become apparent to those skilled in the art with the benefit of the following non-limiting detailed description and upon reference to the accompanying non-limiting drawings. The drawings may not be to scale.

DETAILED DESCRIPTION OF THE INVENTION

A method for producing solid acidic fertilizer granules containing plant fertilizers has been discovered. The method includes controlled addition of a concentrated inorganic acid solution, e.g., containing 50 wt. % or higher of the inorganic acid, to a nitrogen (N), phosphorus (P), and optionally potassium (K), containing plant nutrient. The concentrated inorganic acid solution can be contacted with the plant nutrient at a controlled rate to form an acidified plant fertilizer composition containing up to 40 wt. % of the inorganic acid. As illustrated in a non-limiting manner in Example 1, methods of the present invention can produce solid acidic fertilizer granules with high inorganic acid content. The methods can produce a relatively less amount of caking or lump formation, e.g., less than 10 wt. % of the solid acidic granules produced before screening have a size greater than 4 mm.

These and other non-limiting aspects of the present invention are discussed in further detail in the following sections with reference to the Figures.

A. Method of Making Solid Acidic Fertilizer Granule

Figure 1:
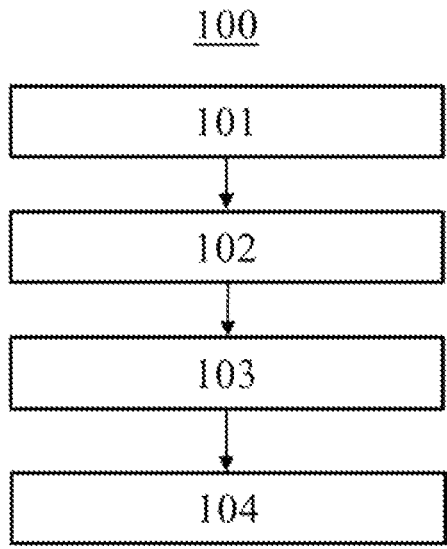
FIG. 1 is a schematic diagram depicting an exemplary method of producing a non-limiting embodiment of an acidified plant fertilizer of the present invention.

With reference to FIG. 1, a non-limiting method 100 for making a plant fertilizer containing solid acidic fertilizer granules is described. The method 100 can be a batch method. The method 100 can include steps 101, 102, 103, and 104.

In step 101, a plant nutrient containing nitrogen (N), phosphorus (P), and optionally potassium (K) can be provided to a container.

In step 102, an acid solution containing an inorganic acid can be fed to the container, and the inorganic acid and the plant nutrient can be contacted in the container to form acidified granules. The acidified granules can have a moisture content of 0.5 wt. % to 1 wt. % or at least one of, equal to any one of, or between any two of 0.5, 0.6, 0.7, 0.8, 0.9, and 1 wt. %. In some aspects, for a batch process, the acid solution can be fed to the container for a duration of 1 to 5 hours or at least one of, equal to any one of, or between any two of 1, 2, 3, 4, and 5 hours. The acid solution can be fed to the container at an average feed rate of 0.2 to 0.8 metric ton of the inorganic acid (MTacid) per hour ($h^{-1}$) per metric ton of the plant nutrient (MT nutrient$^{-1}$), e.g., plant nutrient provided in the container, (MTacid.$h^{-1}$.MT nutrient$^{-1}$) or at least one of, equal to any one of, or between any two of 0.2, 0.3, 0.4, 0.5, 0.6, 0.7, and 0.8 MTacid.$h^{-1}$.MT nutrient$^{-1}$. In some aspects, in step 102 the acid can be fed at a first feed rate for a first duration and a second feed rate for a second duration. In some aspects, the first feed rate can be 0.01 to 0.25 MTacid.$h^{-1}$.MT nutrient$^{-1}$ or at least one of, equal to any one of, or between any two of 0.01, 0.05, 0.1, 0.15, 0.2, and 0.25 MTacid.$h^{-1}$.MT nutrient$^{-1}$ and the first duration can be 0.5 to 3 hours or at least one of, equal to any one of, or between any two of 0.5, 1, 1.5, 2, 2.5, and 3 hours. In some aspects, the second feed rate can be 0.25 to 1, or 0.3 to 1 MTacid.$h^{-1}$.MT nutrient$^{-1}$ or at least one of, equal to any one of, or between any two of 0.25, 0.3, 0.4, 0.5, 0.6, 0.7, 0.8, 0.9, and 1 MTacid.$h^{-1}$.MT nutrient$^{-1}$ and the second duration can be 0.5 to 2 hours or at least one of, equal to any one of, or between any two of 0.5, 1, 1.5, and 2 hours. In some aspects, the acid solution feeding rate can be increased from the first feed to the second feed rate at a ramping rate of 1 to 3 MTacid.$h^{-2}$.MT nutrient$^{-1}$ or at least one of, equal to any one of, or between any two of 1, 1.5, 2, 2.5, and 3 MTacid.$h^{-2}$.MT nutrient$^{-1}$. In some aspects, a second plant nutrient can be fed into the container in step 102. The second plant nutrient can be the same as the plant nutrient, e.g., have the same chemical composition as of the plant nutrient, or be the same as the dried acidified granules, e.g., dried acidified granules having a size smaller and/or larger than the desired size from a prior batch, or different than both, or a combination thereof. The second plant nutrient can be added to step 102 at a plant nutrient to second plant nutrient weight ratio of 1:1 to 5:1 or 1:1, 2:1, 3:1, 4:1, and 5:1, or any ratio there between. In some aspects, in step 102 the plant nutrient, acid solution, and/or the second plant nutrient can be heated during mixing or pre-heated before mixing. In some instances, the ingredients can be heated to room temperature or up to 90° C. or more. In some instances, 20 wt. % or less of the acidified granules produced in step 102 form lumps/cakes of a size greater than 4 mm.

In step 103, the acidified granules can be dried to form dried acidified granules, e.g., solid acidic fertilizer granules. The dried acidified granules can have a moisture content 0.05 wt. % to less than 1 wt. %, preferably 0.05 wt. % to 0.8 wt. % or at most one of, equal to any one of, or between any two of 0.05, 0.1, 0.2, 0.3, 0.4, 0.5, 0.6, 0.7, 0.8, 0.9, and less than 1 wt. %. The dried acidified granules can have an average size of 1 mm to 4 mm. The drying in step 103 can be performed at a temperature 55° C. to 95° C. or 60° C. to 80° C. or at least one of, equal to any one of, or between any two of 55, 60, 65, 70, 75, 80, 85, 90, and 95° C.

In step 104, the dried acidified granules can be passed through a size screen to obtain granules of desired size. In some aspects, dried acidified granules having a size smaller and/or larger than the desired size can be recycled to step 102, e.g., step 102 of a later batch. The acidified granules to be recycled can be ground and recycled to step 102.

Acid addition at a controlled rate at step 102 as described above can result in relatively lower amounts of lump formation or caking. In some aspects, 10 wt. % or less of the dried acidified granules produced in step 103, e.g., before passing the granules through size screen, can have a size greater than 4 mm. In some aspects, 20 wt. % or less, such as 10 wt. % to 20 wt. % of the acidified granules produced in step 102, e.g., before drying, can have a size greater than 4 mm.

In some aspects, the container in step 101 can be a granulator. In some aspects, the container, e.g., the granulator, can be internally lined with an acid resistant coating and/or can be made of acid resistant material. In some aspects, the acid resistant coating and/or container material can contain an acid resistant rubber and/or plastic. The plant nutrient in form of powder, granules, pellets, and/or prills can be provided to the container. In some aspects, the plant nutrient in form of granules of average size 1 mm to 4 mm can be provided to the container. The acid solution can contain 50 wt. % to 98 wt. % or at least one of, equal to any one of, or between any two of 50, 55, 60, 65, 70, 75, 80, 85, 90, 95, 98 wt. % of the inorganic acid. The inorganic acid can be sulfuric acid, hydrochloric acid, nitric acid, or phosphoric acid, or any combination thereof, preferably sulfuric acid. In some aspects, the acid solution can contain 95 wt. % to 98 wt. % or at least one of, equal to any one of, or between any two of 95, 96, 97, and 98 wt. % of sulfuric acid. The acidified granules can be dried in a dryer. The step 101 and 102 can be performed in a same container or in different containers.

In some aspects, the method 100 can optionally include addition of additional additive(s). An additional additive can be added to i) step 101 with the plant nutrient, ii) step 102, e.g., as or with the second plant nutrient and/or separately, and/or iii) after the acidified granules and/or dried acidic granules are formed. The additional additives can include, but are not limited to, a secondary nutrient, one or more trace elements, one or more anticaking agents, water, one or more pigments, or a combination thereof. Non-limiting examples of anticaking agents include surfactants, amines, liquid carriers such as oil and/or water, and/or a URESOFT® product supplied by Kao Chemicals (Kao Corporation, Japan), such as URESOFT®-125. In some aspects, the additional additives added can be less than 5 wt. % of the total weight of the plant nutrient.

In some aspects, the method (100) can optionally include coating the dried acidic fertilizer granule with one, or a second, third, fourth, or more layers. The layers can be, but are not limited to, one or more of a micronutrient, a primary nutrient, a secondary nutrient, a fertilizer, water, one or more solubilizing agent(s), one or more binders, and/or one or more anticaking agents (not shown). For each layer, the amount of time used to apply the coating can be an amount sufficient to ensure that a substantially even layer is formed on the core and/or formed on the subsequent layer. In some instances, the application times can include 5 minutes, 10 minutes, 30 minutes, 1 hour, 2 hours, 3 hours, 4 hours, 5 hours, or more, or any range therein, e.g., 5 minutes to 5 hours, 5 minutes to 1 hour, etc. In some instances, the ingredients are heated to room temperature or up to 90° C. or more.

In some aspects, the method (100) can optionally include combining additional fertilizers with the dried acidic fertilizer granule to form a blended or compounded fertilizer (104). Combining can be performed by any type of blending or mixing apparatus generally available in the art, e.g., WJ-700, WJ-900, or WJ-1000 Mixing Machines from Whirlston Machinery (Zhengzhou, China). Once combined, the fertilizer blend can be stored for future use or sale.

In some instances, the solid acidic fertilizer granule is produced on an industrial scale. In some instances, the solid acidic fertilizer granule is produced at 1 kg/hour or less, or up to 10,000 kg/hour or more.

B. Acidic Plant Fertilizer

The acidic plant fertilizer of the present invention can contain solid acidic fertilizer granules, e.g., the dried acidic granules. The acidic plant fertilizer, e.g., solid acidic fertilizer granules of the present invention, can contain phosphorus, nitrogen, an inorganic acid, and optionally potassium. In some aspects, the plant fertilizer may include a secondary nutrient, one or more trace elements, one or more anticaking agents, water, one or more pigments, or a combination thereof. Non-limiting examples of anticaking agents include surfactants, amines, liquid carriers such as oil and/or water, and/or a URESOFT® product supplied by Kao Chemicals (Kao Corporation, Japan), such as URESOFT®-125.

In some embodiments, the solid acidic fertilizer granule can contain at least 50 wt. % or more of a plant nutrient containing N, P, and optionally K, based on the total weight of the solid acidic fertilizer granule. The solid acidic fertilizer granule can contain at least 55 wt. %, 60 wt. %, 65 wt. %, 70 wt. %, 75 wt. %, 80 wt. %, 85 wt. %, 90 wt. %, 95 wt. %, 100 wt. %, or any concentration therein of the plant nutrient based on the total weight of the solid acidic fertilizer granule. The plant nutrient can form the bulk of the granule. The terms bulk, matrix, and network can be used interchangeably in this specification when referencing the solid acidic fertilizer granule. The inorganic acid can be evenly distributed throughout the bulk of the granule. The solid acidic fertilizer granule can contain 2 wt. % to 40 wt. %, preferably 4 wt. % to 36 wt. %, more preferably 10 wt. % to 35 wt. %, of the inorganic acid.

It is contemplated that the fertilizer granules of the present invention can include any amount of the ingredients discussed in this specification. The granules can also include any number of combinations of additional ingredients described throughout this specification. The concentrations of the any ingredient within the compositions can vary. In non-limiting embodiments, for example, the compositions can comprise, consisting essentially of, or consist of, in their final form, for example, at least about 0.0001%, 0.0010%, 0.0020%, 0.0030%, 0.0040%, 0.0050%, 0.0060%, 0.0070%, 0.0080%, 0.0090%, 0.0100%, 0.0200%, 0.0300%, 0.0400%, 0.0500%, 0.0600%, 0.0700%, 0.0800%, 0.0900%, 0.1000%, 0.2000%, 0.3000%, 0.4000%, 0.5000%, 0.6000%, 0.7000%, 0.8000%, 0.9000%, 1.0%, 2.0%, 3.0%, 4.0%, 5.0%, 6.0%, 7.0%, 8.0%, 9.0%, 10%, 20%, 30%, 35%, 40%, 45%, 50%, 60%, 65%, 70%, 75%, 80%, 85%, 90%, 95%, 99%, 100%, or any range or concentration derivable therein, of at least one of the ingredients that are mentioned throughout the specification and claims. In non-limiting aspects, the percentage can be calculated by weight or volume of the total composition. A person of ordinary skill in the art would understand that the concentrations can vary depending on the addition, substitution, and/or subtraction of ingredients in a given composition.

In some aspects, the solid acidic fertilizer granule can include a coating that contains one or more of water, one or more solubilizing agent(s), one or more binders, and/or one or more anticaking agents. In some instances, the water contained in the coating can be less than 5% by weight of the coating and be considered a dried or dry coating. In some instances, the water content in the coating is less than 4 wt. %, 3 wt. %, 2 wt. %, or 1 wt. % of the weight of the coating. In some aspects, the coating of the acidic fertilizer granule does not contain the inorganic acid. In some aspects, the coating can contain one or more pigments. In some aspects, the solid acidic fertilizer granule of the present invention can contain a coating in any amount, volume, thickness, coverage of the fertilizer granule surface, etc. In some instances, the coating is 0.001 wt. % to 10 wt. %, 0.001 wt. % to 9 wt. %, 0.001 wt. % to 8 wt. %, 0.001 wt. % to 7 wt. %, 0.001 wt. % to 6 wt. %, 0.01 wt. % to 10 wt. %, 0.1 wt. % to 10 wt. %, 0.5 wt. % to 10 wt. %, 0.5 wt. % to 9 wt. %, 0.5 wt. % to 8 wt. %, 0.5 wt. % to 7 wt. %, 0.5 wt. % to 6 wt. %, 1 wt. % to 6 wt. %, or any range therein, of solid acidic fertilizer granule based on the total weight of the coated solid acidic fertilizer granule, or any range therein. In some aspects, at least a portion of the solid acidic fertilizer granule's surface can be in direct contact with the coating. In some instances, the coating is not dispersed throughout the fertilizer granule. In some instances, the coating forms a shell at least partially coating the granule. The coating can coat at least 55%, 60%, 65%, 70%, 75%, 80%, 85%, 90%, 95%, or 100% or more of the surface of the granule. The granule can be coated by the coating so that dissolution of water into the core is decreased as compared to the granule without the coating. In some instances, the coating has a mean average thickness of 2 to 70 μm, 2 to 20 μm, 20 to 50 μm, or 10 to 40 μm, or any range or thickness therein.

The solid acidic fertilizer of the present invention can be included with other fertilizers in a fertilizer composition. In some instances, the solid acidic fertilizer is contained in a blended fertilizer composition or a compounded fertilizer. Additional fertilizers can be chosen based on the particular needs of certain types of soil, climate, or other growing conditions to maximize the efficacy of the blended composition in enhancing plant growth and crop yield. The solid acidic fertilizer herein can be blended with other fertilizers at any concentration. In some instances, the desired concentration is sufficient to meet the required nutrient or micronutrient content in the blend. By way of example, a blended fertilizer composition of the present invention can be formulated into a quick release fertilizer. Alternatively, the blended fertilizer composition can be formulated into a slow-release fertilizer. In some instances, the blended fertilizer composition is formulated into a specialty fertilizer.

C. Method of Fertigation Using Solid Acidic Fertilizer Granule

Figure 2:
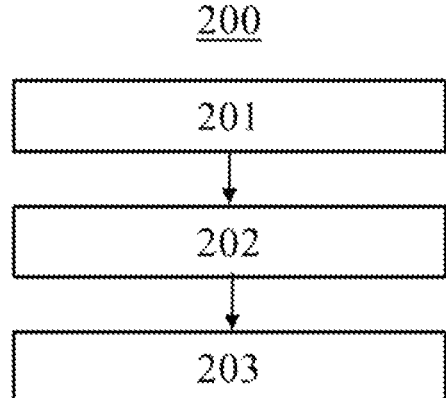
FIG. 2 is a schematic diagram depicting an exemplary method of using non-limiting embodiments of an acidified plant fertilizer of the present invention in fertigation.

With reference to FIG. 2, a non-limiting method (200) of fertigation using the solid acidic fertilizer granule can include combining the solid acidic fertilizer granule with water to form a fertigation solution having a pH less than 4 (201). In some aspects, optionally, the method (200) can include combining fertigation solution with additional water to form a fertilizer solution (202). In some aspects, the method (200) can include applying the fertigation solution or the fertilization solution to a crop (203). In some aspects, the applying (203) can include adding the fertigation solution or the fertilization solution to an irrigation system and applying the fertigation solution or the fertilization solution to a soil and/or a plant via irrigation.

Non-limiting examples of plants that can benefit from the fertilizer of the present invention include vines, trees, shrubs, stalked plants, ferns, etc. The plants may include orchard crops, vines, ornamental plants, food crops, timber, and harvested plants. The plants may include Gymnosperms, Angiosperms, and/or Pteridophytes. The Gymnosperms may include plants from the Araucariaceae, Cupressaceae, Pinaceae, Podocarpaceae, Sciadopitaceae, Taxaceae, Cycadaceae, and Ginkgoaceae families. The Angiosperms may include plants from the Aceraceae, Agavaceae, Anacardiaceae, Annonaceae, Apocynaceae, Aquifoliaceae, Araliaceae, Arecaceae, Asphodelaceae, Asteraceae, Berberidaceae, Betulaceae, Bignoniaceae, Bombacaceae, Boraginaceae, Burseraceae, Buxaceae, Canellaceae, Cannabaceae, Capparidaceae, Caprifoliaceae, Caricaceae, Casuarinaceae, Celastraceae, Cercidiphyllaceae, Chrysobalanaceae, Clusiaceae, Combretaceae, Cornaceae, Cyrillaceae, Davidsoniaceae, Ebenaceae, Elaeagnaceae, Ericaceae, Euphorbiaceae, Fabaceae, Fagaceae, Grossulariaceae, Hamamelidaceae, Hippocastanaceae, Illiciaceae, Juglandaceae, Lauraceae, Lecythidaceae, Lythraceae, Magnoliaceae, Malpighiaceae, Malvaceae, Melastomataceae, Meliaceae, Moraceae, Moringaceae, Muntingiaceae, Myoporaceae, Myricaceae, Myrsinaceae, Myrtaceae, Nothofagaceae, Nyctaginaceae, Nyssaceae, Olacaceae, Oleaceae, Oxalidaceae, Pandanaceae, Papaveraceae, Phyllanthaceae, Pittosporaceae, Platanaceae, Poaceae, Polygonaceae, Proteaceae, Punicaceae, Rhamnaceae, Rhizophoraceae, Rosaceae, Rubiaceae, Rutaceae, Salicaceae, Sapindaceae, Sapotaceae, Simaroubaceae, Solanaceae, Staphyleaceae, Sterculiaceae, Strelitziaceae, Styracaceae, Surianaceae, Symplocaceae, Tamaricaceae, Theaceae, Theophrastaceae, Thymelaeaceae, Tiliaceae, Ulmaceae, Verbenaceae, and/or Vitaceae family.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

Example 1

Production of Acidic Fertilizer Granules with Controlled Acid Addition

Figure 3:
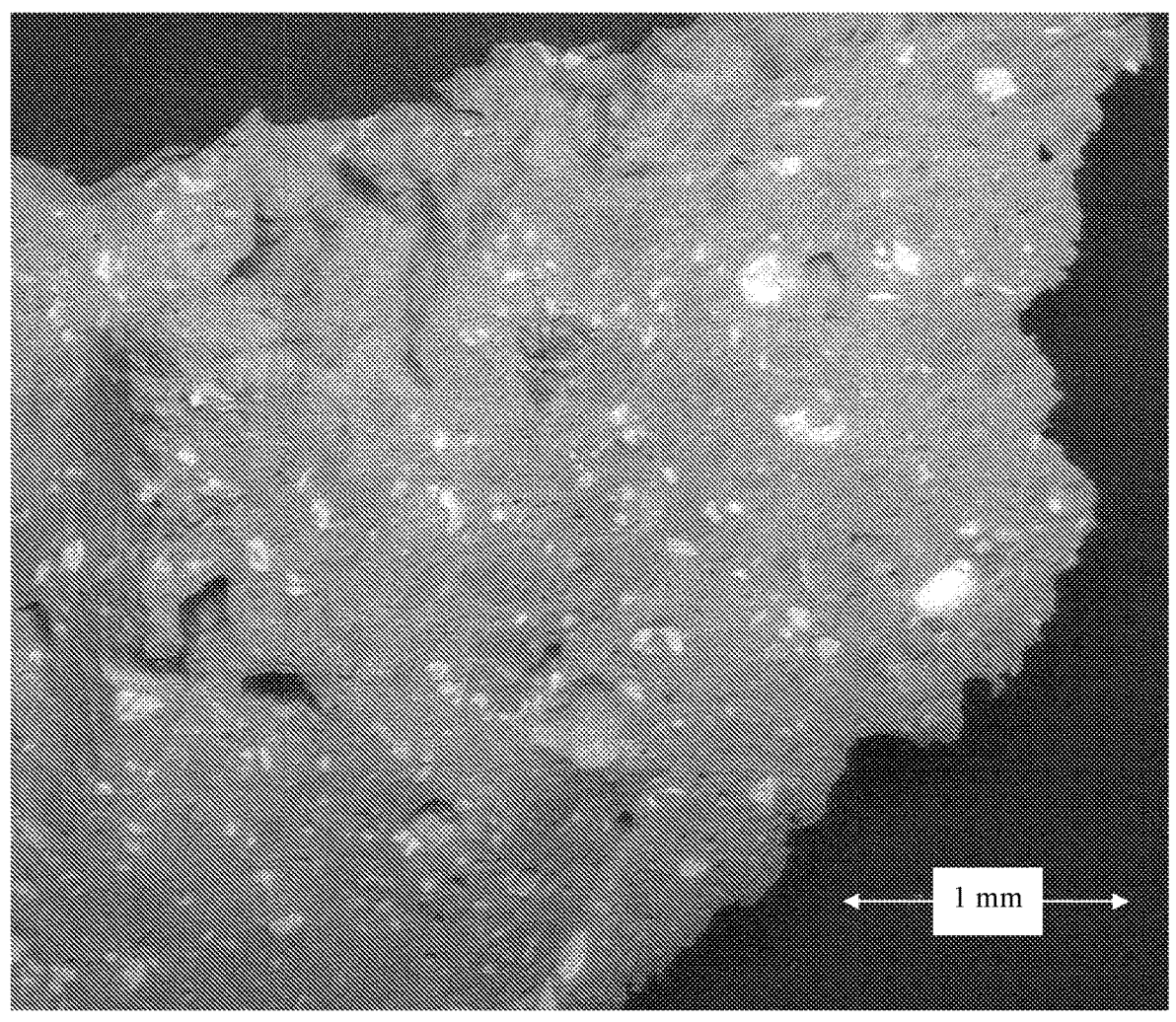
FIG. 3 is a scanning electron microscope (SEM) image of an example acidified NPK fertilizer granule.

In an inventive example, experiment 1, an acidified plant fertilizer containing solid acidic fertilizer granules was produced using a batch method. A plant nutrient containing nitrogen (N), phosphorus (P), and potassium (K) at a weight ratio of 11:29:19 (Table 1) was fed into a granulator. 4 to 10 tons of the plant nutrient was fed to the granulator. An acid solution containing 98 wt. % of sulfuric acid was fed to the granulator. The acid solution in the granulator was contacted and mixed with the plant nutrient, and acidified granules were produced from the mixture of acid solution and the plant nutrient. The acid solution was added to the granulator initially at a first rate of 0.75 metric ton (MT) per hour. The acid solution was added at the first rate for 0.5 to 3 hours. The acid solution addition rate was then increased from the first rate to a second rate of 2.5 to 3.5 MT per hour. The acid solution was added at the second rate for 0.5 to 2 hours. The wetness of the mixture of the acid solution and the plant nutrient was monitored and the acid addition rate was controlled to avoid excessive wetness. The wetness was controlled to keep the moisture content of the acidified granules produced below 1 wt. %. In the granulator, the acidified granules were produced at a temperature of 20 to 45° C. The acidified granules were discharged from the granulator at a temperature 40 to 45° C. and were then dried at 65 to 70° C. at a dryer to form dried acidified granules. Less than 20 wt. % of the acidified granules formed caking or lumps of size greater than 4 mm at the discharge/exit of the granulator. Less than 10 wt. % of the dried acidified granules formed were of a size greater than 4 mm. The dried acidified granules produced contained N:P:K:S at a weight ratio of 7:19:12:15 (Table 1). FIG. 3 shows a SEM image of a dried acidified granule produced. The average crush strength of the dried acidified granules were 5.1 kg/granule. 10 gm of the dried acidified granules fully dissolved in 90 gm of water at 20° C., and the pH of the 100 gm solution produced was 2.27.

TABLE 1

| | Plant nutrient | |
| Component | Plant nutrient added (Wt. %) | Dried acidified fertilizer granules produced (Wt. %) |
| --- | --- | --- |
| N (total) | 11.78% | 7.54% |
| $P_2O_5$ (total) | 29.80% | 19.08% |
| $K_2O$ | 19.0% | 12.19% |
| Sulphur | 6.85% | 14.89% |
| Moisture | 0.4% | 0.7% |
| >4 mm | 10.19% | 7.9% |

TABLE 1-continued

| | Plant nutrient | |
| Component | Plant nutrient added (Wt. %) | Dried acidified fertilizer granules produced (Wt. %) |
| --- | --- | --- |
| 2-4 mm | 83.50% | 81.1% |
| 1-4 mm | 89.81 | 88.0% |
| <1 mm | 0 | 4.10% |
| Crushing Strength | 3.8 kg/granule | 5.1 kg/granule |
| pH of 10% solution | 7.4 | 2.2 |

A comparative experiment was performed. In the comparative experiment, similar processes and parameters as of experiment 1 were used, except the acid addition rate to the granulator was different. In the comparative experiment the acid was added to the granulator at a constant rate of 2.5 to 3.5 MT per hour for 1 to 5 hours. In this experiment, 10 to 15 wt. % of the dried acidified granules, formed after drying, had a size greater than 4 mm. Comparison of experiment 1 and the comparative experiment shows that methods of the present invention result in less lump or cake formation.

The invention claimed is:

1. A method for preparing a plant fertilizer comprising solid acidic fertilizer granules having greater than 10 wt. % up to 40 wt. % of an inorganic acid distributed evenly throughout the solid acidic fertilizer granules, the method comprising:
    (a) providing a plant nutrient comprising nitrogen (N), phosphorus (P) and optionally potassium (K), in a container;
    (b) feeding an acid solution comprising the inorganic acid into the container at a feeding rate comprising an average feed rate of 0.2 to 0.8 metric ton of the inorganic acid (MTacid) per hour per metric ton of the plant nutrient (MTnutrient) (MT acid.$^{-1}$. MT nutrient$^-$₁) and contacting the inorganic acid and the plant nutrient to obtain acidified granules with average moisture content of 0.5% to 1.0%; and
    (c) drying the acidified granules to obtained dried acidic granules, having greater than 10 wt. % up to 40 wt. % of an inorganic acid distributed evenly throughout the dried acidic granules.

2. The method of claim 1, wherein the feeding rate in step (b) comprises a first feed rate of 0.01 to 0.25 MT acid.h$^{-1}$. MT nutrient$^{-1}$ for a first duration and a second feed rate of 0.3 to 1 MT acid.h$^{-1}$.MT nutrient$^{-1}$ nutrient for a second duration.

3. The method of claim 2, wherein the first duration is 0.5 hours to 3 hours, and/or the second duration is 0.5 hours to 2 hours.

4. The method of claim 2, wherein the feeding rate is increased from the first feed rate to the second feed rate at a ramping rate of 1 MT acid.h$^{-1}$.MT nutrient$^{-1}$ per hour (MT acid.h$^{-2}$.MT nutrient$^{-1}$) to 3 MT acid.h$^{-2}$.MT nutrient$^{-1}$.

5. The method of claim 1, wherein step (b) further comprises adding a second plant nutrient, wherein the second plant nutrient is the same as the plant nutrient, is the same as the dried acidic granules, or is different than the plant nutrient and the dried acidic granules, or a combination thereof.

6. The method of claim 5, wherein the plant nutrient and the second plant nutrient has a weight ratio of 1:1 to 5:1.

7. The method of claim 1, wherein in step (b) the acid solution comprising an inorganic acid is fed into the container for a duration of 1 to 5 hours.

8. The method of claim 1, wherein the plant nutrient comprises nitrogen (N):

phosphorus (P): potassium (K) at a weight ratio of 5 to 20:3 to 40:0 to 30.

9. The method of claim 1, wherein the plant nutrient and/or the second plant nutrient consists of one or more N source, one or more P source, optionally one or more potassium K source, optionally water, and optionally a binder.

10. The method of claim 1, wherein the inorganic acid is sulfuric acid, hydrochloric acid, nitric acid, or phosphoric acid, or any combination thereof.

11. The method of claim 1, wherein the acid solution comprises 95 wt. % to 98 wt. % of sulfuric acid.

12. The method of claim 1, wherein the acidified granules are dried at a temperature of 55° C. to 95° C.

13. The method of claim 1, wherein the dried acidic granules have a moisture content of 0.05 wt. % to less than 1 wt. % and/or an average size distribution of 1 mm to 4 mm.

14. The method of claim 1, wherein the method further comprises:

(d) passing the dried acidic granules through a size screen to obtain dried acidic granules having a particle size in the range of 1 to 4 mm.

15. A plant fertilizer comprising solid acidic fertilizer granules obtained by a method of claim 1.

16. The plant fertilizer of claim 15, wherein the plant fertilizer comprises a nitrogen (N): phosphorus (P): potassium (K): sulfur(S) weight ratio of 5 to 20:3 to 40:0 to 30:3 to 25.

17. The plant fertilizer of claim 15, wherein the solid acidic fertilizer granules have an average crush strength 2 to 10 kg/granule, as determined by averaging pressure at which a granule of the solid acidic fertilizer granule will show visible cracks when applying graduated pressure to the granule of the solid acidic fertilizer granule.

18. The plant fertilizer of claim 15, wherein the solid acidic fertilizer granules are capable of forming a solution having a pH of less than 4 when 10 grams of the plant fertilizer is dissolved under ambient condition in 100 ml of water, wherein the water has a pH of 7 or greater before the plant fertilizer is dissolved in the water.

19. The plant fertilizer of claim 15, wherein the plant fertilizer is comprised in a fertilizer blend or a compounded fertilizer comprising the plant fertilizer and an additional fertilizer.

20. A method of fertilizing, the method comprising applying a plant fertilizer made according to the method of claim 1 to at least a portion of a soil, a crop, or the soil and the crop.

* * * * *